USO10183665B2

(12) United States Patent
Shani (10) Patent No.: US 10,183,665 B2
(45) Date of Patent: Jan. 22, 2019

(54) SYSTEM AND METHOD OF AUTOMATED PARKING SYSTEM FOR AUTONOMOUS VEHICLES (71) Applicant: UNITRONICS AUTOMATED SOLUTIONS LTD, Ben Gurion Airport (IL)

(72) Inventor: Haim Shani, Shoham (IL)

(73) Assignee: UNITRONICS AUTOMATED SOLUTIONS LTD, Ben Gurion Airport (IL)

( * ) Notice: Subject to any disclaimer, the term of this patent is extended or adjusted under 35 U.S.C. 154(b) by 14 days.

(21) Appl. No.: 15/379,774

(22) Filed: Dec. 15, 2016

(65) Prior Publication Data
US 2018/0170365 A1   Jun. 21, 2018

(51) Int. Cl.
| | |
|---|---|
| *B60W 30/06* | (2006.01) |
| *E04H 6/30* | (2006.01) |
| *G05D 1/00* | (2006.01) |
| *E04H 6/34* | (2006.01) |
| *E04H 6/42* | (2006.01) |

(52) U.S. Cl.
CPC ............ *B60W 30/06* (2013.01); *E04H 6/302* (2013.01); *E04H 6/34* (2013.01); *E04H 6/424* (2013.01); *G05D 1/0011* (2013.01); *G05D 1/0088* (2013.01)

(58) Field of Classification Search
CPC .. E02F 9/267; E02F 3/308; E02F 3/32; G07C 5/0816; G07C 5/0841; G07C 5/0833; G07C 5/0808; G07C 5/008; G07C 5/0825; G01L 1/16
See application file for complete search history.

(56) References Cited

U.S. PATENT DOCUMENTS

| | | | |
|---|---|---|---|
| 2008/0288104 A1 | 11/2008 | Shani | |
| 2013/0078063 A1* | 3/2013 | Shani | ........................ E04H 6/28 414/253 |
| 2013/0085596 A1* | 4/2013 | Shani | ...................... E04H 6/285 700/217 |
| 2015/0353080 A1 | 12/2015 | Mukaiyama | |
| 2015/0370255 A1* | 12/2015 | Harvey | .............. B62D 15/0285 701/24 |

FOREIGN PATENT DOCUMENTS

WO    WO 2015114592    12/2015

OTHER PUBLICATIONS

Search Report of International Applicaton No. PCT/IL2017/051353 dated Mar. 28, 2018.

* cited by examiner

*Primary Examiner* — Rodney A Butler
(74) *Attorney, Agent, or Firm* — Pearl Cohen Zedek Latzer Baratz LLP (57) ABSTRACT

An automated parking system has a parking entrance unit, a vehicle transport shuttle, shuttle trail means, plurality of parking locations and a controller. The controller is adapted to establish communication with an autonomous vehicle (AV) to be parked in the parking system, to receive signal from the AV indicating that the AV is ready to be controlled by the controller, to receive signal indicating that the parking system is ready to receive and park the AV, to control the movement of the AV toward the vehicle transport shuttle, to control the movement of the vehicle transport shuttle toward a designated parking location and to control the movement of the AV toward the designated parking location.

9 Claims, 5 Drawing Sheets

SYSTEM AND METHOD OF AUTOMATED PARKING SYSTEM FOR AUTONOMOUS VEHICLES

BACKGROUND OF THE INVENTION

Automated parking facilities are parking facilities adapted to receive a vehicle, automatically navigate and convey it to a selected parking place and automatically navigate and convey a vehicle from its parking place to a defined location at the entrance of the parking facility, where a user may drive it from there. Such facilities require the driver to stop the car at the entry of the facility in a proper manner, that is aligned, forward/backward and or sideways, with the facility unit adapted to receive the car. Such facilities require also provide means for moving the vehicle forward and or backward after the driver of the vehicle left the vehicle and/or before the driver enters the vehicle after it was brought to the exit point of the parking facility. Such requirements impose undesired burden on the driver, extend the overall cycle of handling a vehicle in the parking facility and impose undesired complexity on the mechanical and design and the control system design of the parking facility.

There is a need to provide parking facility system and method that will simplify the parking handling process and shorten it while making the use of the facility easier for the vehicle driver.

SUMMARY OF THE INVENTION

An automated parking system is disclosed the system comprising a parking entrance unit, a vehicle transport shuttle, shuttle trail means, plurality of parking locations and a controller. The controller may be adapted, according to some embodiments of the invention, to establish communication with the vehicle to be parked in the parking system, to receive signal from the vehicle indicating that the vehicle is ready to be controlled by the controller, to receive signal indicating that the parking system is ready to receive and park the vehicle, to control the movement of the vehicle toward loading on the vehicle transport shuttle, to control the movement of the vehicle transport shuttle toward a designated parking location and to control the movement of the vehicle toward the designated parking location.

According to additional embodiments, the controller is further adapted to receive indication from the vehicle, after it moved into the designated parking location, indicative of the completion of the parking process and to record the designated parking location as associated with the parked vehicle.

According to additional or alternative embodiments, the controller is further adapted to receive a signal indicative of a request to transport a parked vehicle to the parking entrance unit, to control the vehicle transport shuttle to arrive and stop in front of the parking location associated with the parked vehicle, to control the parked vehicle to move onto the vehicle transport shuttle, to control the vehicle transport shuttle to move and stop in front of the parking entrance unit, to control the parked vehicle to move to unload off the vehicle transport shuttle and onto the parking entrance unit, and to issue a signal indicative that the parked car is ready to be taken out of the parking system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Reference is made now to FIG. 2, which is a schematic block diagram of a control scheme of an automated parking facility according to embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although some embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Large number of vehicles are manufactured with autonomous driving capabilities, such as avoiding getting too close to a vehicle in front, keeping a lane on the road, providing warnings of obstacle posing a potential threat to the vehicle and activating avoidance means such as breaking, changing direction and the like. Vehicles with autonomous capabilities, herein after autonomous vehicle or AV or simply vehicle, such as driving at very low speed in a defined direction in response to a remote command to the vehicle and stopping and shutting the vehicle's systems in response to another command, as well as re-starting the vehicle's systems and driving at very low speed in a defined direction at a command to the vehicle and stopping at yet another command, while the vehicle is also equipped with communication capabilities to external controller, may be activated in an improved and simplified parking facility, according to some embodiments of the present invention. Certain vehicles with autonomous driving capabilities may also be equipped with communication capabilities for wirelessly communicating with remote units over radio network(s) as is known in the art, such as Bluetooth® (BT) format communication, WiFi® communication, etc. Some autonomous vehicles may be adapted to operate completely with no intervention of a driver or other type of operator, and may be capable to be connected, over wireless communication channel, with remote systems. Such vehicles will be referred herein below as Fully Autonomous Vehicle (FAV).

An autonomous vehicle with wireless communication capabilities may be adapted to provide a set of basic data items such as AV unique ID string, AV format of providing control commands and receiving performance indications, AV parking fee payment arrangement, AV floor "footprint" dimensions (vehicle length and width, vehicle height, vehicle distance from front to rear wheels, etc.

Some automated car parking facilities known in the art, adapted to move a vehicle in the parking facility in a X-Y system in a parking floor, utilize a first shuttle (or similar device) to move a vehicle from the entry point of the parking facility and to load it onto a second shuttle usable for moving the car and the first shuttle towards a point in front of a designated parking place, where the first dedicated shuttle is used to unload from the second shuttle and to move the vehicle to its parking place. When a vehicle is taken from its parking place to the outlet of the parking facility, the above steps are taken in a reversed order.

An AV having the capabilities as defined above may enable communicating and accessing the AV from remote, starting its engine, and controlling its movement at least along straight short lines forward and/or backward. The ability to control the AV in this way when there is no driver controlling the AV allows, according to some embodiments of the present invention, omitting the first shuttle described above with respect to automated parking facilities known in the art, as described in details herein below. Such capabilities may render certain elements of a known automated car parking facility redundant.

Figure 1:
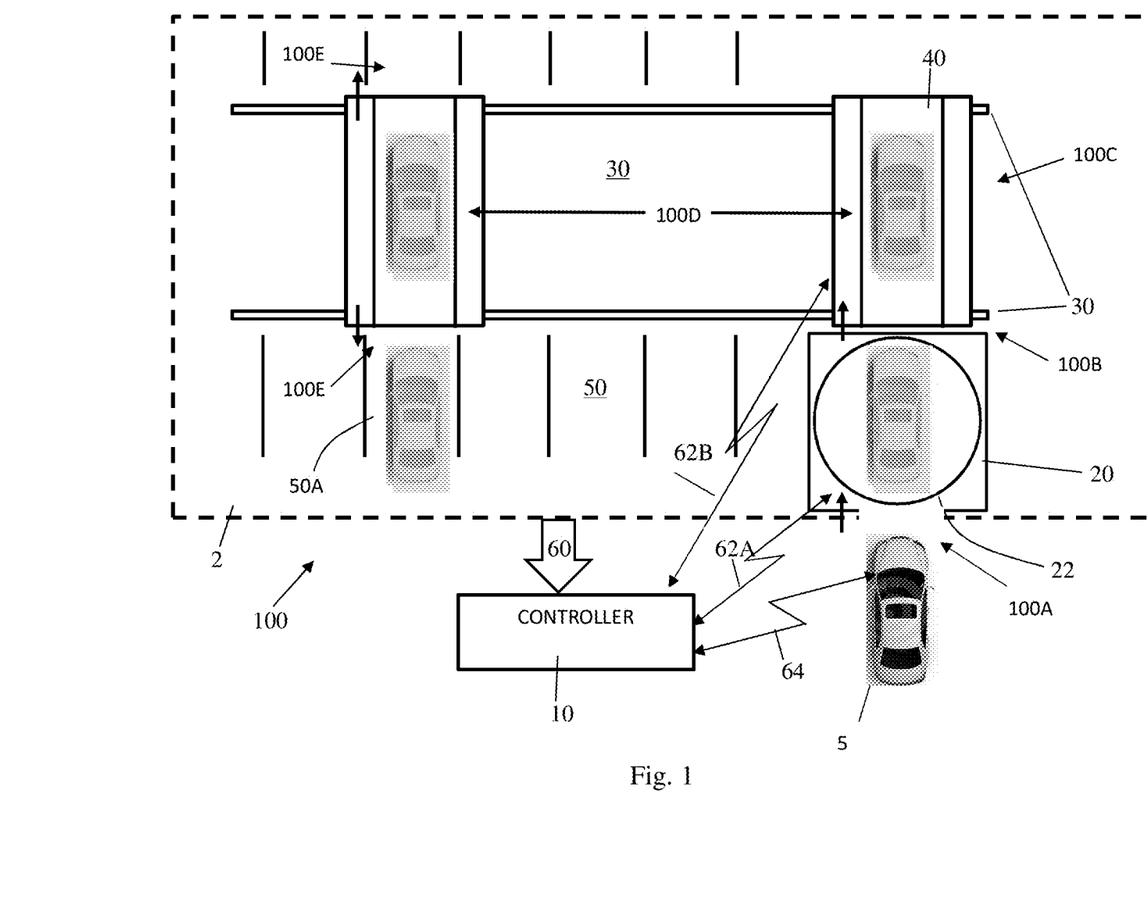
FIG. 1 is a schematic illustration of a parking facility structured and operative according to embodiment of the present invention an automated parking facility, such as the automated system of FIG. 1, according to embodiments of the present invention.

Reference is made to FIG. 1, which is a schematic illustration of parking facility 100 structured and operative according to embodiment of the present invention. Parking facility (PF) 100 comprises parking lot 2 comprising plurality of parking locations 50, vehicle transport shuttle 40 to load vehicle 5 from parking entrance 20, to move along shuttle trail means 30 from entrance point 20 towards a designated parking location 50 and to unload vehicle 5 into parking location 50A. Parking entrance 20 comprises entrance gate 22 via which a vehicle may enter PF 100 for being parked, or via which a vehicle may leave PF 100 when parking service ends. Parking entrance unit 20 may be adapted to enable a vehicle to enter via entrance gate 22, to park substantially in the middle of parking entrance unit 20 and to aim the entering vehicle to be substantially aligned with a longitudinal axis of vehicle transport shuttle 40 to allow loading the vehicle on vehicle transport shuttle 40. In a similar manner, parking entrance unit 20 may be adapted to receive a vehicle being unloaded from vehicle transport shuttle 40, and to align it with a traveling line leading entrance gate 22.

Vehicle 5 may be, according to some embodiments, a FAV. The description of embodiments herein below refers to AV. When the vehicle served by the automated parking system of the invention is a FAV certain changes may be made, and some capabilities may not be required, as presented below. PF 100 further comprises controller unit 10 in active coupled via communication channels with vehicle 5, with entrance point 20, and with transport shuttle 40. Controller 10 may also be coupled via communication channel to a remote management center (not shown). PF 100 of FIG. 1 schematically describes automated parking structure and operation according to some embodiments of the present invention, in a single parking floor, or level. It will be apparent that, in parking facilities comprising more than one parking floor, the embodiments described here may similarly be used.

Control unit 10 is coupled via communication channel or channels with vehicle 5 (channel 64), with entrance point unit 20 (channel 62A), with transport shuttle 40 (channel 62B) and with various optional sensors located in parking lot 2 of PF 100, such as presence sensors, presence cameras, etc. (channel 60) and optionally with remote control center (via channel 66).

Vehicle 5 is shown in FIG. 1 in various possible locations in PF 100, according to different stages of the operation of PF 100. When vehicle 5 enters PF 100 in order to be parked in it, at stage 100A, it is driven by its driver onto entrance point unit 20. When vehicle 5 has reaches the rest location on entrance point unit 20, the driver shuts off its engine and leaves the vehicle. If minor corrections of the alignment of the longitudinal axis 5A of vehicle 5 with the longitudinal line 40A of transport shuttle 40 are required, this may be handled using one of the methods known in the art, such as a turntable disposed in entrance point unit 20, that may be rotated with vehicle 5 until longitudinal axis 5A is properly aligned. At stage 100B, transport shuttle 40 is controlled so that its longitudinal central line 40A coincides with the central longitudinal axis 5A of vehicle 5, and vehicle 5 is being now subject to the control of control unit 10, via communication channel 62A. Control unit 10 powers up vehicle 5 and commands it to drive slowly straight forward, onto transport shuttle 40. At stage 100C, vehicle 5 has reached rest location on transport shuttle 40 and is controlled by control unit to stop, shift gear to "park" and shut off its engine. Detailed description of how vehicle 5 is monitored and controlled during loading onto and unloading from transport shuttle 40 is made below with regard to FIGS. 3A and 3B.

At stage 100D, transport shuttle 40 may be controlled to move along path 30 in one of known methods until it reaches location against designated parking location 50A. If PF 100 comprises more than one floor, transport shuttle 40 may be moved vertically from the entrance floor to the floor of the designated parking location, as is known in the art. Once transport shuttle 40 is aligned properly with designated parking location 50A, control unit 10 communicates control commands to vehicle 5 to start the engine, shift gear from park to slow driving gear and drive vehicle 5 off transport shuttle 40 into designated parking location 50A, either driving forward or in reverse gear, depending on the relative location of designated parking location 50A with respect to the nose direction of vehicle 5. At the end of stage 100E, control unit 10 may record the specific parking location of vehicle 5 for future use. The time of beginning of the parking may also be recorded, for example for use in parking facilities where the parking time is used to calculate the parking fee.

When it is required to move vehicle 5 out of PF 100 the above stages may be performed in a reverse order, with the required obvious changes. When vehicle 5 is called out of PF 100, at the end of the vehicle return vehicle 5 is parked in entrance point unit 20, ready to be taken by its driver. In case where payment of the parking fee is done following the return of vehicle 5 to entrance point unit 20, the parameters affecting the parking fee are communicated to control unit 10 which may provide payment information to the driver, or may affect wire payment, as fits the payment arrangements of the vehicle driver or owner.

When the vehicle served by PF 100 is a FAV, the steps associated with the operations taken by a driver, at the entrance to the PF when approaching the PF or when leaving it, may not be needed. Further, certain additional sensors may be required to facilitate accurate control of the stages of the FAV entering PF 100 entrance 20 via gate 22, or leaving PF 100 when parking service ends. The type, location of installation and accuracy of these sensors may be determined independently of the specific fully autonomous capabilities of the FAV, or may be determined to meet and address these capabilities. Such sensors, control capability over the FAV and the like should be determined and operable to ensure accurate guidance of a vehicle into, or out from the PF while ensuring proper level of safety.

Figure 2:
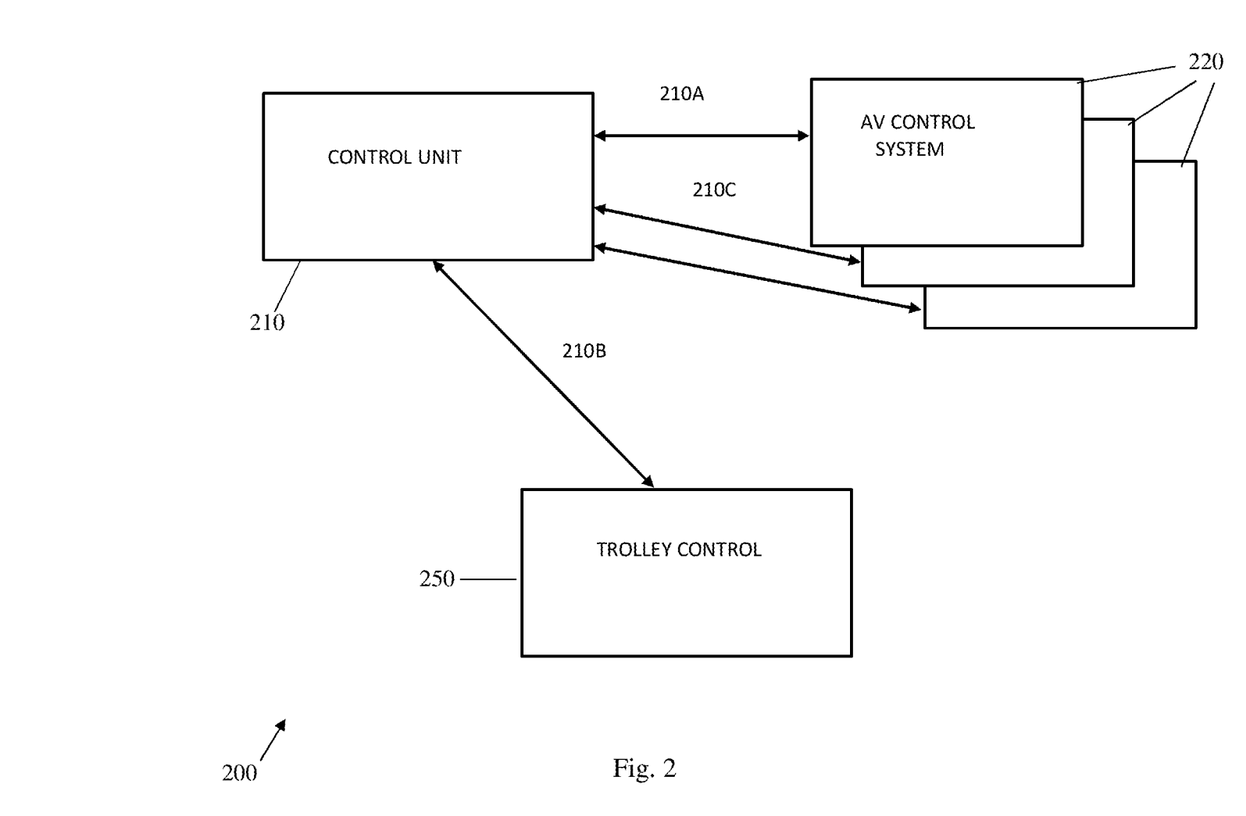

Reference is made now to FIG. 2, which is a schematic block diagram of control scheme 200 of automated parking facility, such as PF 100, according to some embodiments of the present invention. Control scheme comprising control unit 210, corresponding to control unit 10 of FIG. 1, may be in active communication 210B with control unit 250 of a trolley, such as transport shuttle 40 of FIG. 1, and in active communication 210A with one or more AV control systems 220 of vehicles such as vehicle 5 of FIG. 5. Control unit 210 may be also in active communication 210C with remote central control unit.

Each one of control units 210, 220 and 250 may comprise a controller, memory unit, storage unit including non-transitory storage medium, communication handling unit and, optionally, user input/output unit (not shown), as is known in the art. The controller unit may be, for example, a central processing unit processor (CPU), a chip or any suitable computing or computational device. The memory unit may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 may be or may include a plurality of, possibly different memory units. The storage unit may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in the storage unit and may be loaded from the storage unit into the memory unit where it may be processed by the controller. The storage unit may be embedded or included in a memory unit. Software programs including operating system and code adapted to perform methods and steps described in this application when executed may be loaded and executed by the controller unit.

Figure 3A:
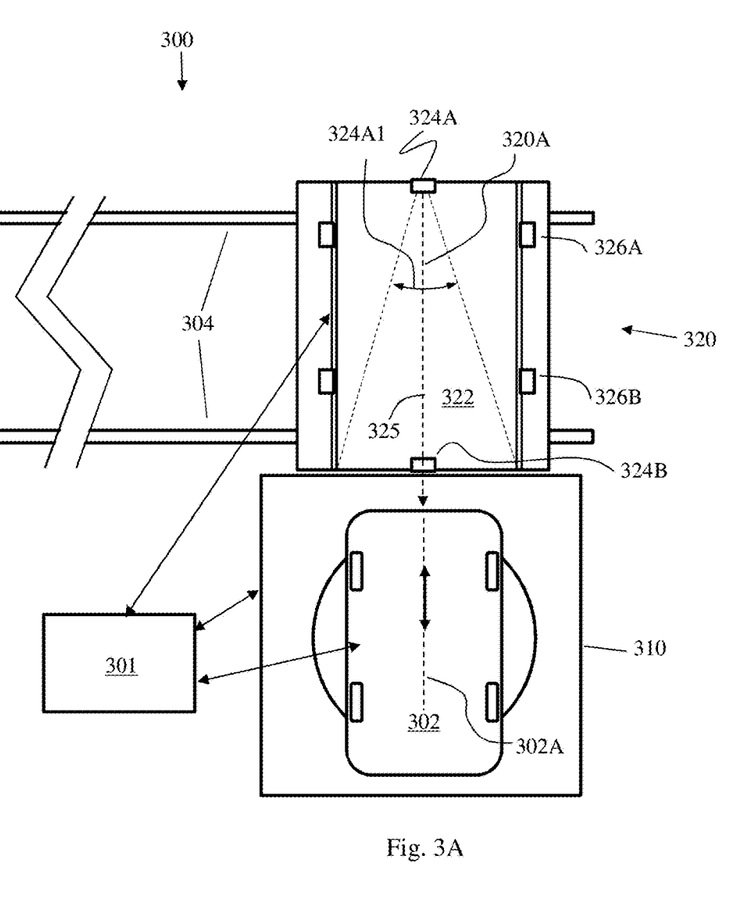
FIG. 3A is a schematic illustration of the process of control and monitoring of loading a vehicle onto a shuttle in the automated parking facility, according to embodiments of the present invention.
Figure 3B:
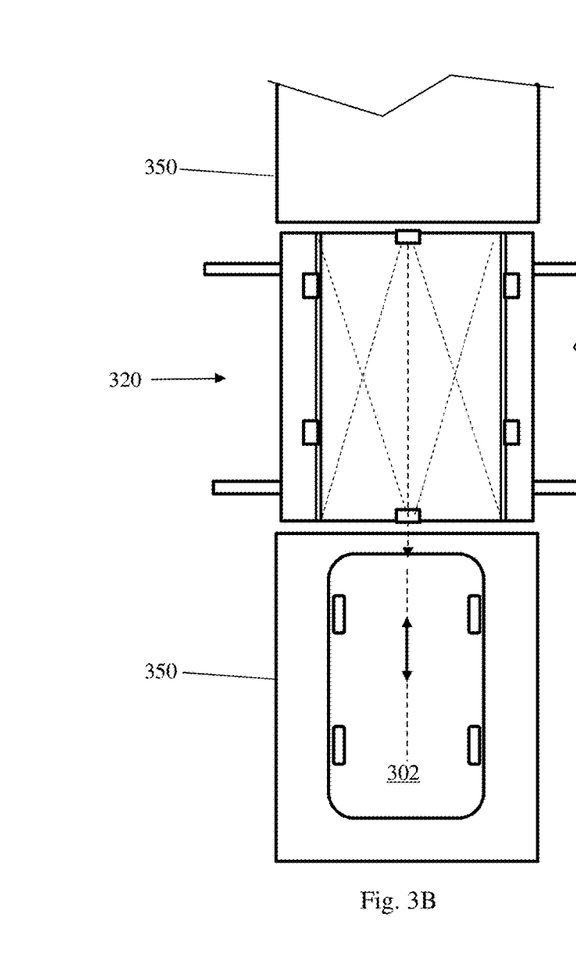
FIG. 3B is a schematic illustration of a process of the control and monitoring of loading and carrying a vehicle to a designated parking location, according to embodiments of the present invention.

Reference is made now to FIG. 3A, which is a schematic illustration of the process of control and monitoring of loading vehicle 302 onto shuttle 320, and to FIG. 3B, which a schematic illustration of the control and monitoring of loading and carrying vehicle 302 to designated parking location 350, according to some embodiments of the present invention. The description of operations below refers to AV that requires presence of a driver until the vehicle rests at the entry point of the PF, or when taken out of the PF. FAV, which may be adapted to mobility with no driver present in the vehicle, may need certain changes and adaptations in the parking or de-parking processes, as well as in the equipment of the PF, as explained above.

During receipt of vehicle 302 into a parking facility, according to some embodiments of the present invention, vehicle 302 may be positioned at parking entrance point 310 by its driver. The driver may shut down the engine and park vehicle 302 and leave the place. At this stage, control is transferred to a PF controller 301, similar to controller 10 of FIG. 1. Controller 301 may be in active communication with vehicle 302, with parking entrance point unit 310 and with shuttle 320. Commands shuttle 320 to move along its track 304 until it is positioned with its central longitudinal line 320A aligned with central longitudinal line 302A of vehicle 302.

Shuttle 320 may be equipped with sectorial distance sensor 324A and sectorial distance sensor 324B, disposed each at one end of shuttle 320 along central line 320A and directed to measure distance from the sensor along shuttle 320 and beyond it. Shuttle 320 may further be equipped with at least one position sensor 3326A/326B, disposed along at least one side of shuttle 320 at location enabling to sense when a vehicle is safely positioned between forward and backward ends, with respect to the direction of central line 320A of shuttle 320. Sensors 324A/324B and sensors 326A/326B may be any suitable sensor adapted to sense the events and distances as described above.

When vehicle 302 is ready to be loaded onto shuttle 320, controller assumes 301 control over vehicle 302, similarly to the description made above with respect to FIG. 1. Controller 301 commands vehicle 302 to start the engine, change gear from "park" to slow drive in order to cause vehicle 302 to slowly move towards shuttle 320. The direction of movement to be performed by vehicle 302 is determined by its direction orientation with respect to shuttle 320. The progress of vehicle 302 towards shuttle 320, and the alignment of this movement with respect to shuttle 320, the distance that is left to go and the centralizing, or alignment of vehicle 302 with respect to shuttle 320 may be monitored by sensors 324A/324B and 326A/326B. In the example of FIG. 3A, distance and sector sensor 324A may monitor the distance of vehicle 302 from a stop reference point on shuttle 320 as vehicle 302 approaches shuttle 320. In the case where sensor 324A is adapted to monitor and report also the deviation of approaching vehicle 302 from shuttle 320 central line 320A, its indications indicative of the developing deviation from the central line may be communicated to controller 301 in order re-align vehicle 302 to the central line, if vehicle 302 enables remote steering, or abort the loading in case the deviation puts the loading process at risk and may not be corrected. In case the information provided by the vehicle to controller 301 at the entrance to the parking facility includes physical dimensions, such as length and width of the vehicle, distance of the front wheels from the rear wheels, distance of the front wheels from the front end of the vehicle or/and the distance of the rear wheels from the rear end of the vehicle, that data may be used instead of monitoring the location of the vehicle with respect to shuttle 320, or in addition to the location indications received from location sensors 324A/324B and 326A/326B.

It would be appreciated by those skilled in the art that the more control parameters in the vehicle at the parking facility are available to be controlled by controller 301 of the parking facility, and the more status indications of the vehicle are available to controller 301 of the parking facility, the less corresponding status sensors and location/orientation correction means will be required at the parking facility. For example, a vehicle equipped with collision avoidance system that may transmit its indications, or at least collision warnings, to controller 301 of the parking facility, may obviate installing sensors indicative of the location of the vehicle with respect to the trolley without degrading the level of safety of the parking facility.

Similarly, to the process of loading of the vehicle onto the trolley and the monitoring of it, the process of unloading a vehicle form the trolley is controlled and monitored by controller 301 relying on location and orientation indications received from the respective sensors and/or from the vehicle itself. After vehicle 302 is loaded and safely parked on shuttle 320, the trolley is controlled to move along track 304 toward parking location 350 assigned to vehicle 302 by controller 301. Shuttle 320 is stopped against parking location 350, as is known in the art. After shuttle 320 is aligned with parking location 350, controller 301 resumes control over vehicle 302, starts its engine, shifts its gear from "park" to "drive" and control it to move, forward or backward—as the case may be, into parking location 350. Location in parking location 350 and the alignment of vehicle 302 with respect to parking location 350, may be monitored and controlled similarly to the way it is done when vehicle 302 loads onto shuttle 320, as described above. Accordingly, the location and alignment of vehicle 302 with respect to parking location 350 and the indication that the unloading has finished and shuttle 320 is free to move to its next assignment may be received from sensors on board of shuttle 320, such as sensors 324A/324B and 326A/326B and/or from sensing systems on board of vehicle 302.

Figure 4A:
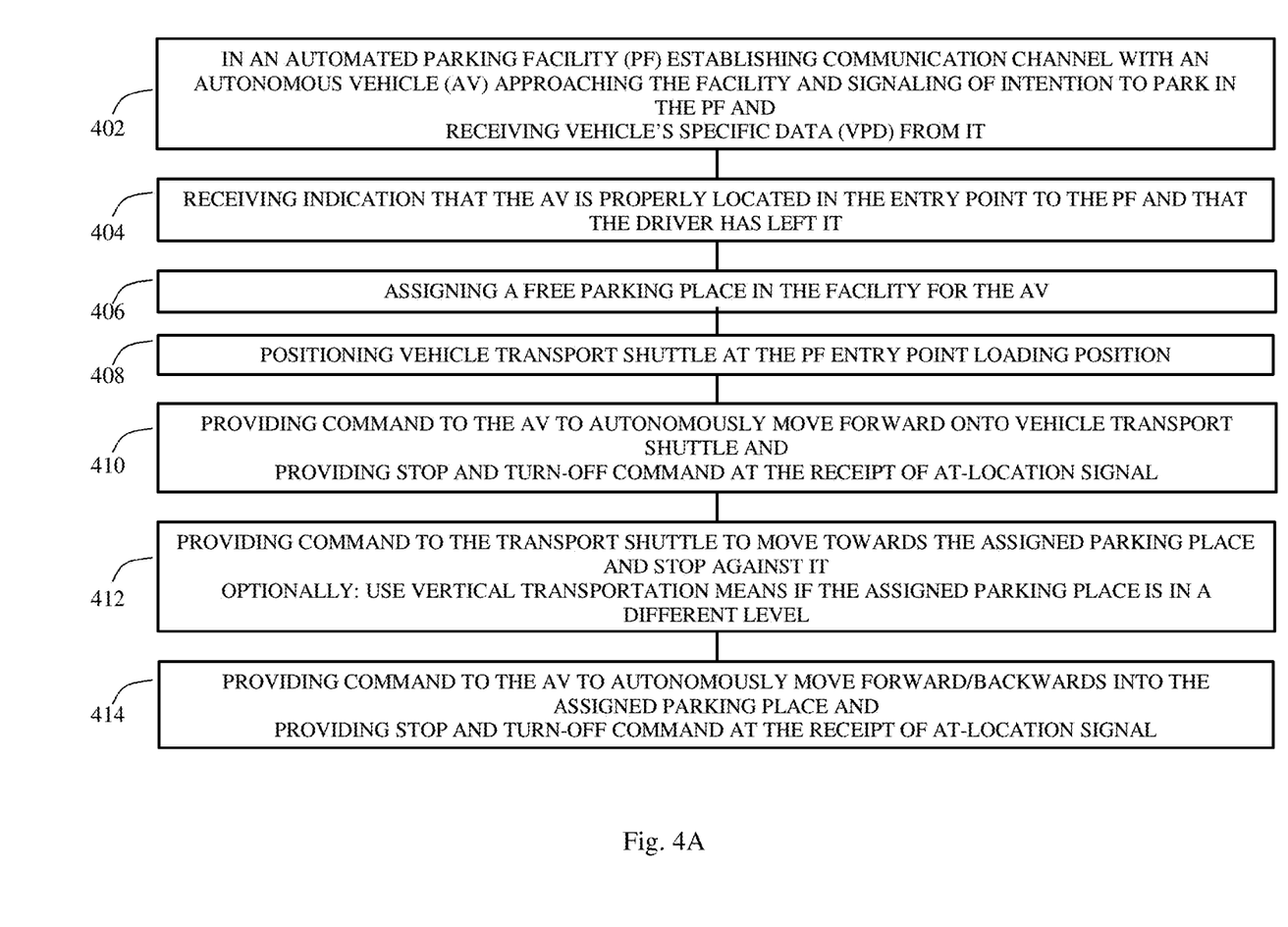
FIGS. 4A and 4B are flow diagrams depicting the steps involved in automated parking of a vehicle in a parking facility and automated return of a parked vehicle from its parking location, respectively, according to embodiments of the present invention.
Figure 4B:
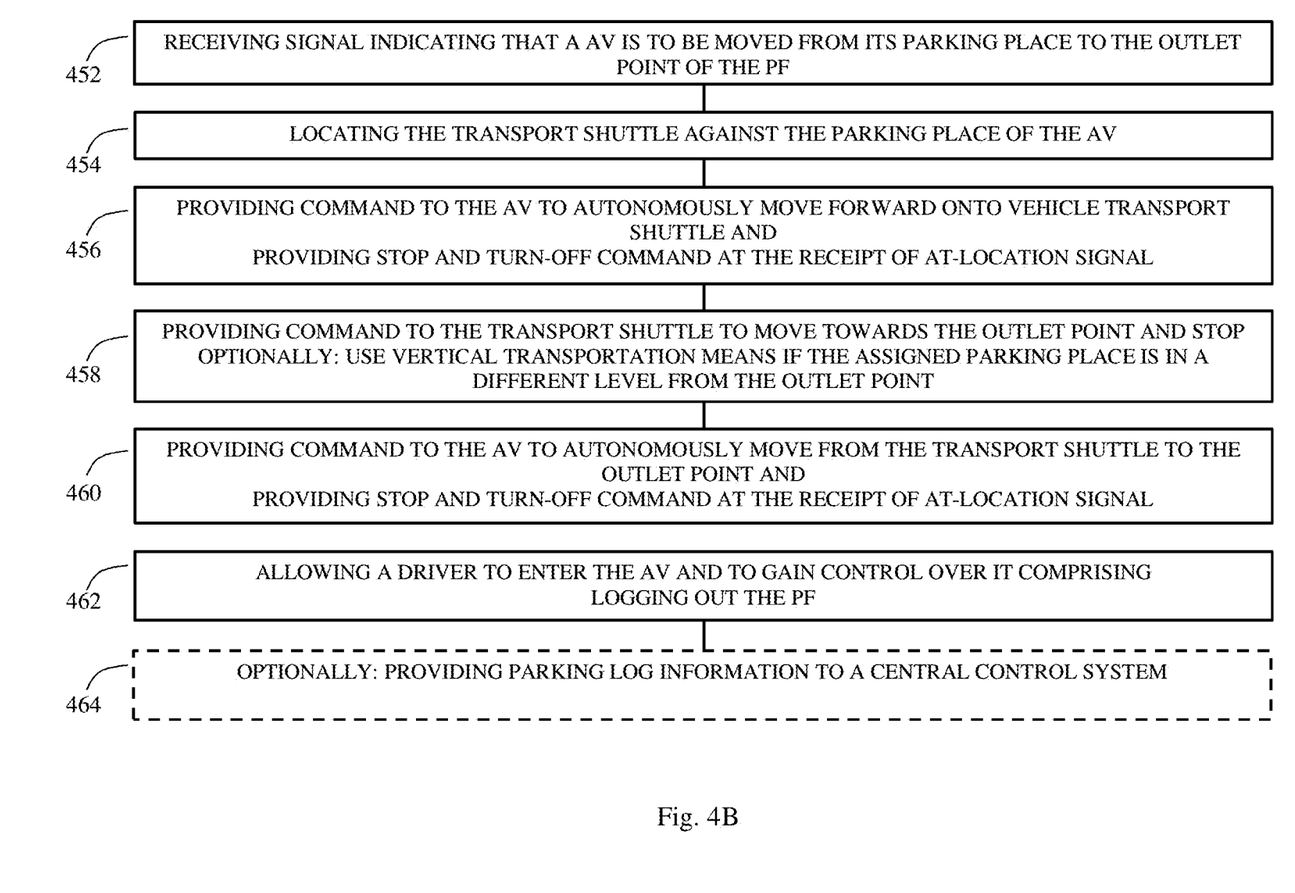

Reference is made now to FIGS. 4A and 4B, which are flow diagrams depicting the steps involved in automated parking of a vehicle in a parking facility and automated return of a parked vehicle from its parking location, respectively, according to embodiments of the present invention.

In block 402, establishing, in an automated parking facility (PF), communication channel with an autonomous vehicle (AV), approaching the facility and signaling of intention to park in the PF, and receiving vehicle's specific data (VPD) from it. In block 404, receiving indication that the AV is properly located in the entry point to the PF and that the driver has left it.

In block 406, assigning a free parking place in the PF for the AV and, in block 408, positioning the vehicle transport trolley at the PF entry point loading position. In block 410, providing command to the AV to autonomously move forward onto vehicle transport shuttle and providing stop and turn-off command at the receipt of at-location signal. In block 412, providing command to the transport trolley to move towards the assigned parking place and stop against it, and optionally: use vertical transportation means if the assigned parking place is in a different level.

In block 414, providing command to the AV to autonomously move forward/backwards into the assigned parking place and providing stop and turn-off command at the receipt of at-location signal.

When the parked vehicle is called to the outlet of the parking facility the following steps take place. In block 450, receiving signal indicating that a AV is to be moved from its parking place to the outlet point of the PF. In block 454, locating the transport trolley against the parking place of the AV. In block 456, providing command to the AV to autonomously move forward onto vehicle transport trolley and providing stop and turn-off command at the receipt of at-location signal.

In block 458, providing command to the transport trolley to move towards the outlet point and stop. Optionally, using vertical transportation means if the assigned parking place is in a different level from the outlet point. In block 460, providing command to the AV to autonomously move from the transport trolley to the outlet point and providing stop and turn-off command at the receipt of at-location signal.

In block 462, allowing a driver to enter the AV and to gain control over it, comprising logging out the PF. Optionally, in block 464, providing parking log information to a central control system.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An automated parking system comprising:
a parking entrance point;
a vehicle transport shuttle;
plurality of parking locations; and
a controller, adapted to:
establish communication with an autonomous vehicle to be parked in the parking system after a driver of the autonomous vehicle shuts off an engine of the autonomous vehicle and leaves the autonomous vehicle at the parking entrance point;
receive a signal from the autonomous vehicle indicating that the autonomous vehicle is ready to be controlled by the controller;
receive a signal indicating that the parking system is ready to receive and park the autonomous vehicle;
power up the autonomous vehicle;
control the movement of the autonomous vehicle from the parking entrance point toward loading on the vehicle transport shuttle;
control the movement of the vehicle transport shuttle toward a designated parking location; and
control the movement of the autonomous vehicle from the vehicle transport shuttle toward the designated parking location.

2. The system of claim 1, wherein the controller is further adapted to:
receive indication from the autonomous vehicle, after it moved into the designated parking location, indicative of the completion of the parking process; and
record the designated parking location as associated with the parked vehicle.

3. The system of claim 1, wherein the controller is further adapted to:
- receive a signal indicative of a request to transport a parked vehicle to the parking entrance point;
- control the vehicle transport shuttle to arrive and stop in front of the parking location associated with the parked vehicle;
- control the parked vehicle to move onto the vehicle transport shuttle;
- control the vehicle transport shuttle to move and stop in front of the parking entrance point;
- control the parked vehicle to move to unload off the vehicle transport shuttle and onto the parking entrance point; and
- issue a signal indicative that the parked vehicle is ready to be taken out of the parking system.

4. A method for automatically parking an autonomous vehicle in a parking system comprising a parking entrance point, a vehicle transport shuttle, plurality of parking locations and a controller, the method comprising:
- establishing communication with the autonomous vehicle to be parked in the parking system after a driver of the autonomous vehicle shuts off an engine of the autonomous vehicle and leaves the autonomous vehicle at the parking entrance point;
- receiving a signal from the autonomous vehicle indicating that the autonomous vehicle is ready to be controlled by the controller;
- receiving a signal indicating that the parking system is ready to receive and park the autonomous vehicle;
- powering up the autonomous vehicle;
- controlling the movement of the autonomous vehicle from the parking entrance point toward loading on the vehicle transport shuttle;
- controlling the movement of the vehicle transport shuttle toward a designated parking location; and
- controlling the movement of the autonomous vehicle from the vehicle transport shuttle toward the designated parking location.

5. The method of claim 4, further comprising:
- receiving indication from the autonomous vehicle, after it moved into the designated parking location, indicative of the completion of the parking process; and
- recording the designated parking location as associated with the parked vehicle.

6. The method of claim 4, further comprising:
- receive a signal indicative of a request to transport a parked vehicle to the parking entrance point;
- controlling the vehicle transport shuttle to arrive and stop in front of the parking location associated with the parked vehicle;
- controlling the parked vehicle to move onto the vehicle transport shuttle;
- controlling the vehicle transport shuttle to move and stop in front of the parking entrance point;
- controlling the parked vehicle to move to unload off the vehicle transport shuttle and onto the parking entrance point; and
- issuing a signal indicative that the parked vehicle ear is ready to be taken out of the parking system.

7. A non-transitory storage medium having stored thereon software code that when it is executed causes a controller in a parking system comprising also a parking entrance point, a vehicle transport shuttle, and plurality of parking locations, to:
- establish communication with an autonomous vehicle to be parked in the parking system after a driver of the autonomous vehicle shuts off an engine of the autonomous vehicle and leaves the autonomous vehicle at the parking entrance point;
- receive a signal from the autonomous vehicle indicating that the autonomous vehicle is ready to be controlled by the controller;
- receive a signal indicating that the parking system is ready to receive and park the autonomous vehicle;
- power up the autonomous vehicle;
- control the movement of the autonomous vehicle from the parking entrance point toward loading on the vehicle transport shuttle;
- control the movement of the autonomous vehicle transport shuttle toward a designated parking location; and
- control the movement of the autonomous vehicle from the vehicle transport shuttle toward the designated parking location.

8. The non-transitory storage medium of claim 7 further causing the controller to:
- receive indication from the autonomous vehicle, after it moved into the designated parking location, indicative of the completion of the parking process; and
- record the designated parking location as associated with the parked vehicle.

9. The non-transitory storage medium of claim 7 further causing the controller to:
- receive a signal indicative of a request to transport a parked vehicle to the parking entrance point;
- controlling the vehicle transport shuttle to arrive and stop in front of the parking location associated with the parked vehicle;
- controlling the parked vehicle to move onto the vehicle transport shuttle;
- controlling the vehicle transport shuttle to move and stop in front of the parking entrance point;
- controlling the parked vehicle to move to unload off the vehicle transport shuttle and onto the parking entrance point; and
- issuing a signal indicative that the parked vehicle is ready to be taken out of the parking system.

* * * * *